(12) United States Patent
Lee (10) Patent No.: US 11,351,729 B2
(45) Date of Patent: Jun. 7, 2022

(54) ASSEMBLY TYPE AXIAL DRIVE MODULE AND 3D PRINTER USING THE SAME

(71) Applicant: Anatz Inc., Seoul (KR)

(72) Inventor: Dongyub Lee, Seoul (KR)

(73) Assignee: Anatz Inc., Seoul (KR)

( * ) Notice: Subject to any disclaimer, the term of this patent is extended or adjusted under 35 U.S.C. 154(b) by 344 days.

(21) Appl. No.: 16/733,246

(22) Filed: Jan. 3, 2020

(65) Prior Publication Data
US 2021/0206067 A1 Jul. 8, 2021

(51) Int. Cl.
*B29C 64/232* (2017.01)
*B33Y 30/00* (2015.01)
*B29C 64/236* (2017.01)
*B29C 64/118* (2017.01)

(52) U.S. Cl.
CPC .......... *B29C 64/232* (2017.08); *B29C 64/118* (2017.08); *B29C 64/236* (2017.08); *B33Y 30/00* (2014.12)

(58) Field of Classification Search
CPC ... B29C 64/118; B29C 64/232; B29C 64/236; B33Y 30/00
See application file for complete search history.

(56) References Cited

U.S. PATENT DOCUMENTS

| 8,516,903 B2 * | 8/2013 | Yagati | G01L 3/04 |
| | | | 73/862.321 |
| 2015/0140158 A1 * | 5/2015 | Cervantes | B29C 64/209 |
| | | | 425/461 |
| 2016/0368218 A1 * | 12/2016 | Cruz | B29C 64/118 |
| 2019/0168452 A1 * | 6/2019 | Besim | B29C 64/209 |
| 2019/0176392 A1 * | 6/2019 | Yang | B29C 64/259 |

FOREIGN PATENT DOCUMENTS

KR    10-2016-0089224 A    7/2016

* cited by examiner

*Primary Examiner* — Joseph S Del Sole
*Assistant Examiner* — Manley L Cummins, IV
(74) *Attorney, Agent, or Firm* — Revolution IP, PLLC (57) ABSTRACT

An assembly-type axial drive module includes: a first motor having a gear protruding from a rear side thereof; a first board coupled to the rear side of the first motor; a second board coupled to a rear side of the first board; a third board coupled to a rear side of the second board; a fourth board coupled to a rear side of the third board; a fifth board coupled to a rear side of the fourth board; a sixth board coupled to a rear side of the fifth board; a seventh board coupled to a rear side of the sixth board to provide weight balancing; and a second motor coupled to a rear side of the seventh board and connected to a filament storage unit storing filaments to move the filaments.

9 Claims, 6 Drawing Sheets

ASSEMBLY TYPE AXIAL DRIVE MODULE AND 3D PRINTER USING THE SAME

FIELD

The present invention relates to an assembly-type axial drive module and a 3D printer using the same. More particularly, the present invention relates to an assembly-type axial drive module used as a moving unit adapted to move a nozzle unit of a 3D printer, wherein the assembly-type axial drive module is made up of multiple component blocks and is thus easy to assemble while being easy to disassemble, thereby having improved portability, and a 3D printer using the same.

BACKGROUND

Unlike 2D printing, such as blueprinting and graphic printing, 3D printing is a technology of implementing and copying a 3D shape, and has caused a lot of changes in the entire manufacturing process from planning to production due to capability thereof to reproduce the shape of a product in a few hours.

As an improvement of existing 2D printing techniques, 3D printing creates an actual shape through stepwise stacking of printouts and is actually used in the medical industry, such as dental modeling and pre-surgical simulation, and in the construction industry, such as creation of miniature buildings and real-time architecture design.

In addition, 3D printing technology can allow design based on reverse engineering (a process of extracting basic design information based on deep analysis of a finished product) and reduction in design error by copying an already created article or by making a shape created by computer aided design (CAD) into a real object.

As described above, 3D printing allows anyone with a digital design drawing and a 3D printer, anywhere in the world, to produce desired products, and thus is regarded as the core of a paradigm shift in the manufacturing industry through drastic simplification of a manufacturing process.

3D printing has already been used in manufacture of prototypes at production sites since the late 1980s. With recent development of material technology, besides plastic, glass and metal are also used as a material for 3D printers, thereby allowing a more diverse product range. In addition, the price of 3D printers, which reached hundreds of thousands of dollars, has dropped to tens of thousands of dollars, and, with release of 3D printer products available for thousands of dollars, popularization of 3D printers is at hand.

In response to diverse individual needs, personalized goods that are difficult to produce through an existing standardized mass production process can be directly produced using a 3D printer. In addition, 3D printing technology is expected to accelerate development and innovation in the manufacturing industry by drastically reducing trial and error in the process of producing goods, from product planning to prototype implementation.

Existing personal 3D printers are delivered to a user from a manufacturer in kit form for assembly by the user.

Such a 3D printer is complicated enough that it takes 5 hours to assemble, and weighs a lot due to a metal frame thereof having a weight of 10 kg or more, thus increasing difficulty in assembly.

RELATED LITERATURE

Patent Document (Patent Document 0001) Korean Patent Publication No. 10-2016-0089224 (title: 3D printing system and method, date of publication: 27 Jul. 2016)

SUMMARY

It is an aspect of the present invention to provide an assembly-type axial drive module used as a moving unit adapted to move a nozzle unit of a 3D printer, wherein the assembly-type axial drive module is made up of multiple component blocks and is easy to assemble and disassemble, thereby having improved portability, and 3D printer using the same.

In accordance with one aspect of the present invention, there is provided an assembly-type axial drive module including: a first motor having a gear protruding from a rear side thereof; a first board coupled to the rear side of the first motor and having a first gear passing-through portion allowing the gear to pass therethrough; a second board coupled to a rear side of the first board and having a second gear passing-through portion allowing the gear to pass therethrough; a third board coupled to a rear side of the second board and including a first movement guide block allowing a horizontal shaft to pass therethrough; a fourth board coupled to a rear side of the third board and having a first block insertion portion allowing the first movement guide block to be partially inserted thereinto; a fifth board coupled to a rear side of the fourth board and including a second movement guide block allowing a vertical axis to pass therethrough; a sixth board coupled to a rear side of the fifth board and having a second block insertion portion allowing the second movement guide block to be partially inserted thereinto; a seventh board coupled to a rear side of the sixth board to provide weight balancing; and a second motor coupled to a rear side of the seventh board and connected to a filament storage unit storing filaments to move the filaments.

The third board may further include two third board bodies horizontally formed to face each other and spaced apart from each other; and the first movement guide block may include two first movement guide blocks coupled to surfaces of the two third board bodies facing each other, respectively, spaced apart from each other, and horizontally formed, wherein the two first movement guide blocks may each be formed therein with a first block hole having a first bearing formed on an inner surface thereof.

The diameter of the first movement guide block may be larger than the width of the surfaces of the two third board bodies facing each other.

The fifth board may include two fifth board bodies vertically formed to face each other and spaced apart from each other; the second movement guide block may include two second movement guide blocks coupled to surfaces of the two fifth board bodies facing each other, respectively, spaced apart from each other, and vertically formed; the fifth board may further include a block connection panel coupled to each of the surfaces of the two second movement guide blocks facing each other to connect the two second movement guide blocks to each other; each of the second movement guide blocks may be formed therein with a second block hole, the second block hole having a second bearing formed on an inner surface thereof; and the block connection panel may have a connection panel hole formed at a center thereof, wherein the connection panel hole may have a first thread formed on an inner surface thereof.

The diameter of the second movement guide block may be larger than the width of the surfaces of the fifth board bodies facing each other.

The gear may pass through the second gear passing-through portion of the second board to protrude toward the fifth board; and the second board may have a belt tension maintaining portion protruding therefrom in a direction in which the gear protrudes.

In accordance with another aspect of the present invention, there is provided a 3D printer using the assembly-type axial drive module set forth above, the 3D printer including: a stacking unit; a Z-axis movement unit connected to one side of an upper surface of the stacking unit to move the assembly-type axial drive module in the Z-axis direction; an X-axis movement unit moved in the X-axis direction by the assembly-type axial drive module; and a nozzle unit coupled to the X-axis movement unit and adapted to spray filaments moved by the second motor, wherein the stacking unit comprises a stacking stage formed at the other side of the upper surface thereof and adapted to stack the filaments thereon, and the stacking stage is provided on a lower surface thereof with a Y-axis movement unit adapted to move the stacking stage in the Y-axis direction.

The Z-axis movement unit may include: Z-axis movement guide shafts inserted into the second block holes of the second movement guide blocks, respectively, to guide a movement direction of the fifth board; a Z-axis movement shaft inserted into the connection panel hole of the block connection panel and having a second thread formed on an outer surface thereof to be engaged with the first thread; and a Z-axis stopper coupled to an end of each of the Z-axis movement guide shafts and an end of the z-axis movement shaft, wherein the assembly-type axial drive module may be moved up or down depending on a rotational direction of the Z-axis movement shaft to move the nozzle unit up or down.

The X-axis movement unit may include: X-axis movement guide shafts inserted into the first block holes of the first movement guide blocks, respectively, to guide the movement direction of the third board; a timing belt disposed across a space between the first movement guide blocks facing each other, having teeth to be engaged with the gear, and remaining tensioned by the belt tension maintaining portion; and X-axis stoppers coupled to opposite ends of the timing belt and opposite ends of each of the X-axis movement guide shafts, respectively, wherein the X-axis movement unit may be moved right or left depending on the rotational direction of the gear to move the nozzle unit right or left.

The present invention provides an assembly-type axial drive module which is used as a movement unit adapted to move a nozzle unit of a 3D printer, wherein the assembly-type axial drive module is made up of multiple component blocks and is easy to assemble while being easy to disassemble, thereby having improved portability, and a 3D printer using the same.

DETAILED DESCRIPTION

Hereinafter, embodiments of the present invention will be described with reference to the accompanying drawings. It should be noted that like components will be referred to by like names and by like reference numerals throughout the specification and the accompanying drawings. In addition, descriptions of details apparent to those skilled in the art will be omitted for clarity.

An assembly-type axial drive module according to the present invention will be described with reference to FIG. 1 to FIG. 4.

Figure 1:
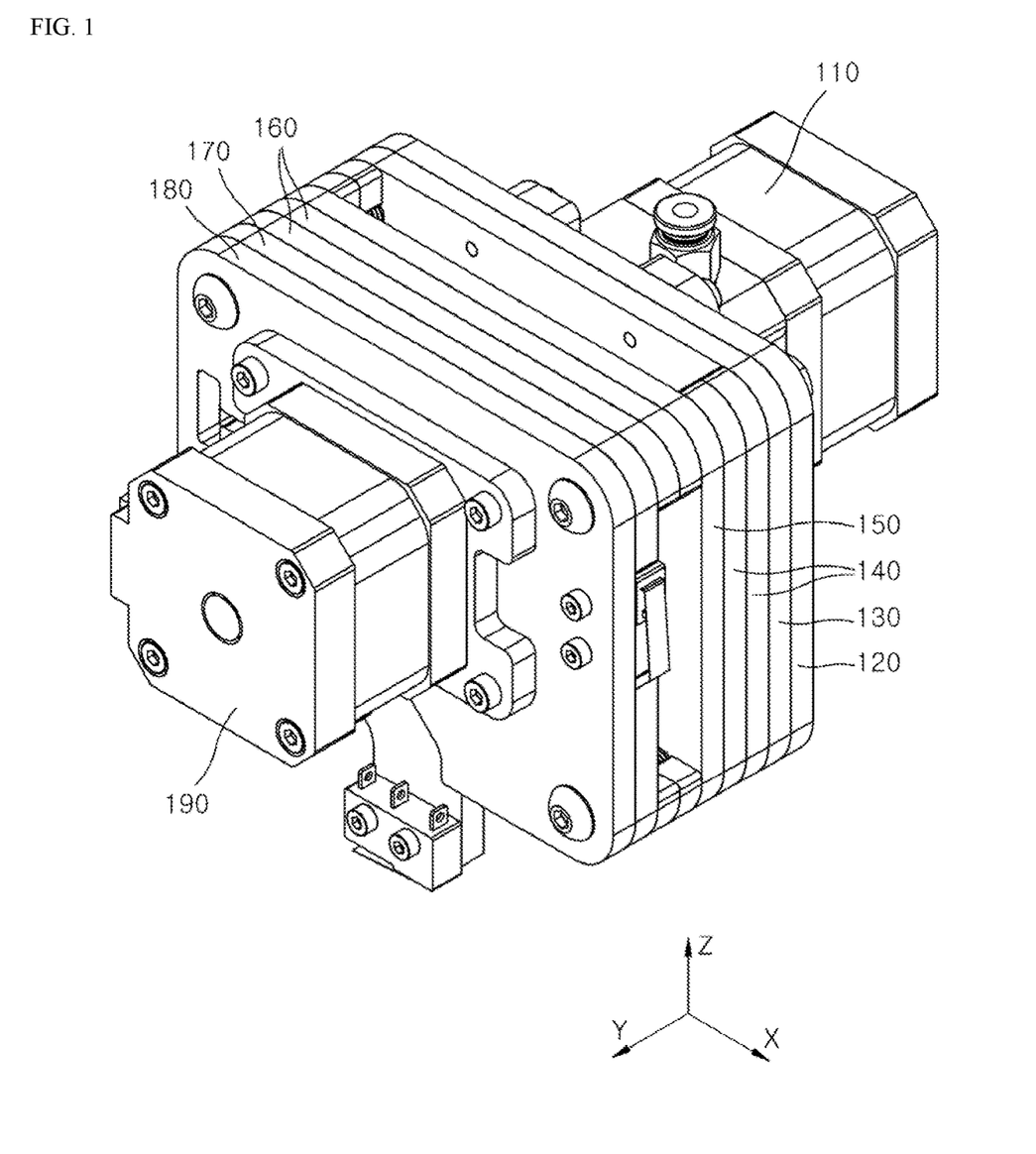
FIG. 1 is a perspective view of an assembly-type axial drive module according to the present invention.
Figure 2:
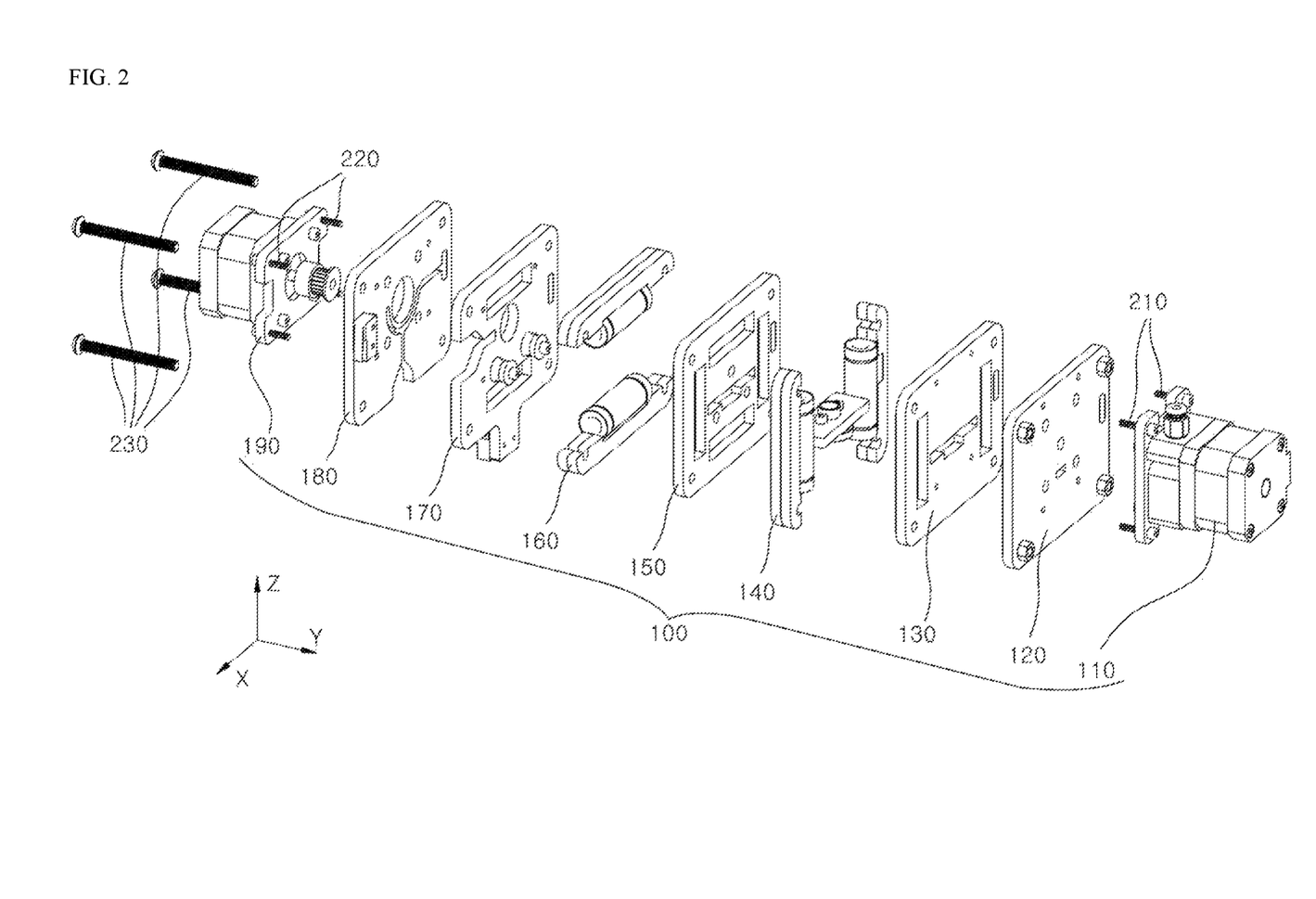
FIG. 2 is an exploded view of the assembly-type axial drive module according to the present invention.

Referring to FIG. 1 and FIG. 2, the assembly-type axial drive module according to the present invention includes a drive body 100 and a body fastener 200.

The drive body 100 is configured to be assembled with and mounted on a 3D printer using the assembly-type axial drive module according to the present invention described below to move a nozzle unit (5000 in FIG. 5) of the 3D printer along z- and x-axes. Specifically, the drive body 100 includes a first motor 190, first to seventh boards 180 to 120, and a second motor 110.

The first motor 190 has a gear 191 protruding therefrom toward the first board 180, that is, protruding from a rear side thereof, wherein the gear 191 is connected to a timing belt 3100 described below.

The first board 180 is coupled to the rear side of the first motor 190, the second board 170 is coupled to a rear side of the first board 180, the third board 160 is coupled to a rear side of the second board 170, the fourth board 150 is coupled to a rear side of the third board 160, the fifth board 140 is coupled to a rear side of the fourth board 150, the sixth board 130 is coupled to a rear side of the fifth board 140, the seventh board 120 is coupled to a rear side of the sixth board 130, and the second motor 110 is coupled to a rear side of the seventh board 120. The first to seventh boards 180 to 120 will be described in detail below with reference to FIG. 3 and FIG. 4.

The second motor 110 is connected to a filament storage unit (not shown) storing filaments to move the filaments to the nozzle unit 5000 described below.

Figure 3:
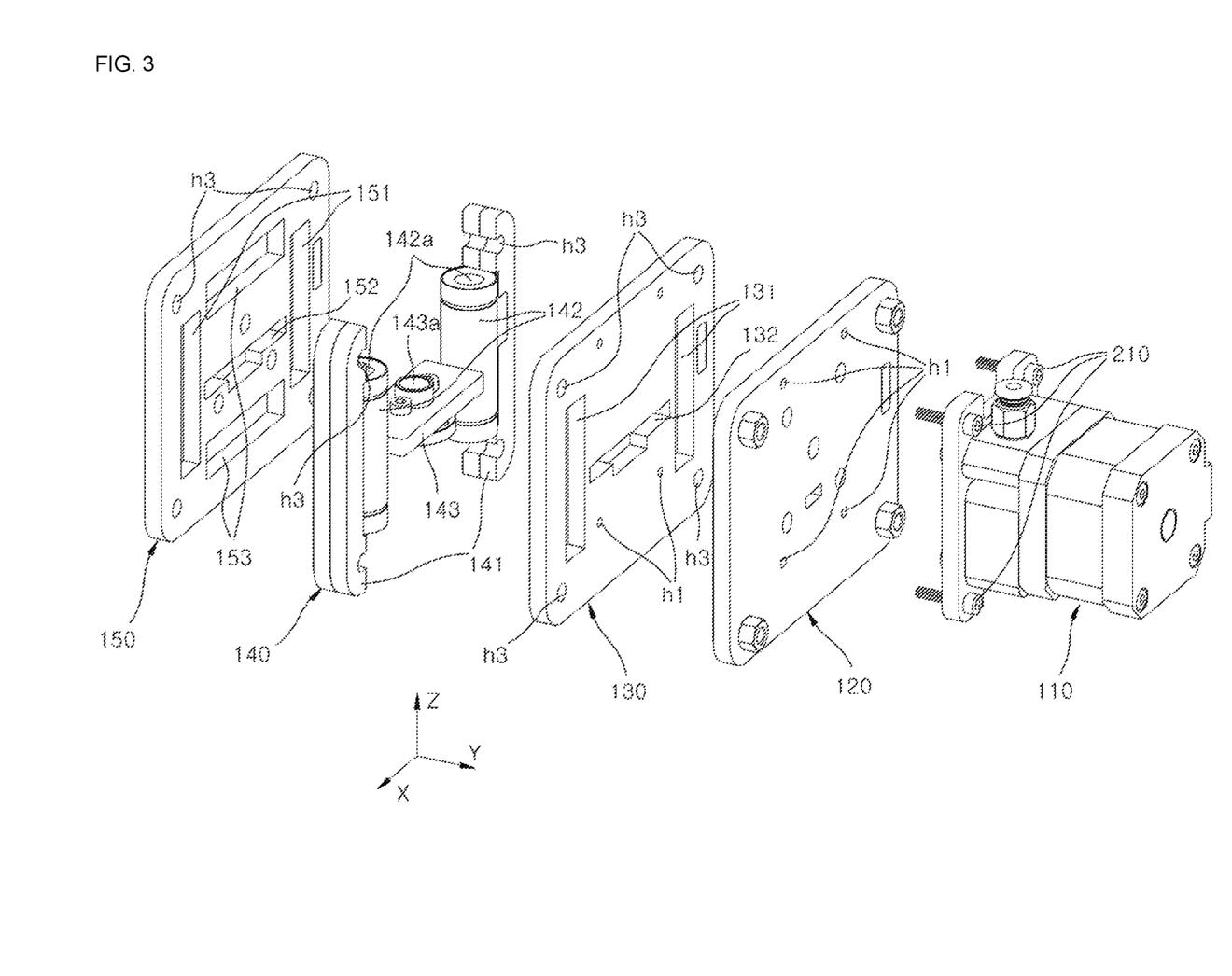
FIG. 3 is a view of a second motor and fourth to seventh boards of the assembly-type axial drive module according to the present invention.

Now, the fourth to seventh boards 150 to 120 will be described in detail with reference to FIG. 3.

The fifth board 140 includes a fifth board body 141, a second movement guide block 142, and a block connection panel 143.

The fifth board body 141 includes two fifth board bodies having the same shape, erected in the vertical direction (in the Z-axis direction), and spaced apart from each other to face each other.

The second movement guide block 142 includes two second movement guide blocks coupled to surfaces of the two fifth board bodies 141 facing each other, respectively, and formed in the vertical direction like the fifth board body 141.

Here, the second movement guide block 142 is formed therein with a second block hole 142a allowing a vertical shaft, that is, a Z-axis movement guide shaft 2200 described below, to pass therethrough, wherein the second block hole is provided on an inner surface thereof with a second bearing (not shown).

That is, the second bearing is formed on the inner surface of the second block hole 142a of the second movement guide block 142, which would otherwise directly contact the Z-axis movement guide shaft (2200 in FIG. 5 and FIG. 6), whereby friction of the second movement guide block 142 can be minimized when the second movement guide block 142 is moved in the Z-axis direction along the Z-axis movement guide shaft 2200.

The block connection panel 143 is connected between the second movement guide blocks 142 facing each other and is formed at the center thereof with a connection panel hole 143a having a first thread formed on an inner surface thereof.

Here, a Z-axis movement shaft (2100 in FIG. 5 and FIG. 6) described below is connected to the connection panel hole 143a, which will be described in detail further below.

In addition, the diameter of the second movement guide block 142 is larger than the width of the surfaces of the two fifth board bodies 141 facing each other, and the sixth board 130 and the fourth board 150 are thus formed with respective second block insertion portions 131, 151 allowing the second movement guide block 142 to be partially inserted thereinto or to pass therethrough.

Further, when the width of the block connection panel 143 is larger than the width of the surfaces of the two fifth board bodies 141 facing each other, the sixth board 130 and the fourth board 150 may be formed with respective panel insertion holes 132, 152 allowing the block connection panel 143 to be partially inserted thereinto or to pass therethrough.

Figure 4:
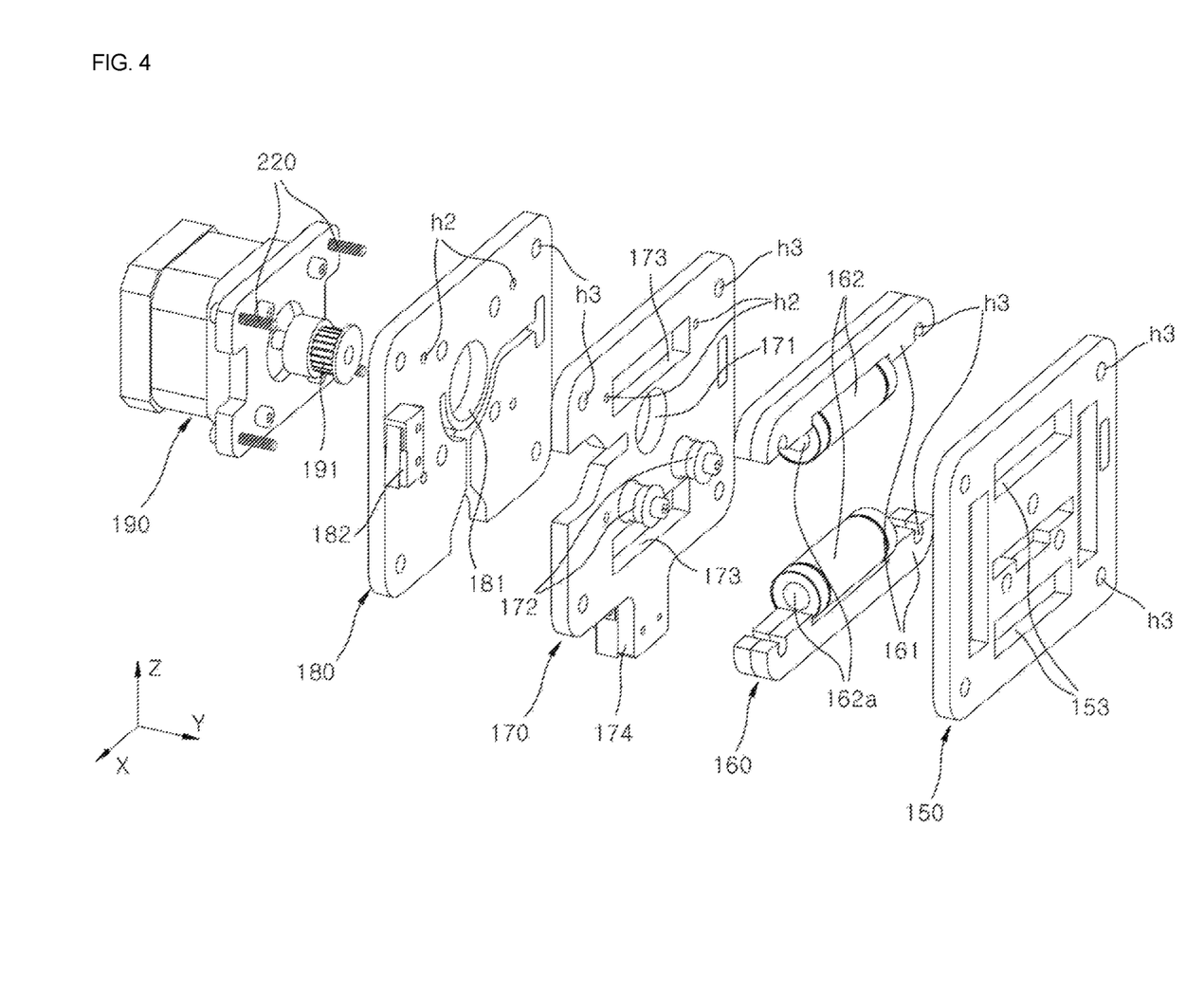
FIG. 4 is a view of a first motor and first to fourth boards of the assembly-type axial drive module according to the present invention.

Next, the first to fourth boards 180 to 150 and the first motor 190 according to the present invention will be described with reference to FIG. 3 and FIG. 4.

The third board 160 includes a third board body 161 and a first movement guide block 162.

The third board body 161 includes two third board bodies having the same shape, disposed in the horizontal direction (in the X-axis direction) to be parallel to each other, and spaced apart from each other to face each other.

The first movement guide block 162 includes two first movement guide blocks coupled to surfaces of the two third board bodies 161 facing each other, respectively, and disposed in the horizontal direction like the third board body 161.

Here, like the second movement guide block 142, the first movement guide block 162 is formed therein with a first block hole 162a allowing a horizontal shaft, that is, an X-axis movement guide shaft (3200 in FIG. 5 and FIG. 6) described below, to pass therethrough, wherein the first block hole 162a is provided on an inner surface thereof with a first bearing (not shown).

That is, the first bearing is formed on the inner surface of the first block hole 162a of the first movement guide block 162, which would otherwise directly contact the X-axis movement guide shaft 3200, whereby friction of the first movement guide block 162 can be minimized when the first movement guide block 162 is moved in the Z-axis direction along the X-axis movement guide shaft 3200.

In addition, the diameter of the first movement guide block 162 is larger than the width of the surfaces of the third board bodies 161 facing each other, and the fourth board 150 and the second board 170 are thus formed with respective first block insertion portions 153,173 allowing the first movement guide block 162 to be partially inserted thereinto or to pass therethrough.

The first board 180 and the second board 170 are formed with a first gear passing-through portion 181 and a second gear passing-through portion 171, respectively, to allow the gear 191 of the first motor 190 to pass therethrough, wherein the gear 191 sequentially passes through the first gear penetrating portion 181 and the second gear penetrating portion 171 to protrude from the second board 170 toward the third board 160.

In addition, the second board 170 has a belt tension maintaining portion 172 protruding therefrom in a direction in which the gear 191 protrudes, wherein the belt tension maintaining portion 172 may be freely varied in number. Details of the belt tension maintaining portion 172 and the gear 191 will be described further below.

Further, the first board 180 includes an X-axis zero adjustment unit 182 formed at an edge thereof to adjust the zero point of the X-axis, and the second board 170 includes a Z-axis zero adjustment unit formed on a lower side thereof to adjust the zero point of the Z-axis.

Furthermore, each of the first to seventh boards 180 to 120 may be formed with an interconnect for electrical wiring, wherein the shape of the interconnect may be varied depending on the type of wiring.

The body fastener 200 includes a first fastener 210, a second fastener 220, and a third fastener 230.

The first fastener 210 sequentially passes through the second motor 110, the seventh board 120, and the sixth board 130 to achieve coupling therebetween.

Here, each of the second motor 110, the seventh board 120, and the sixth board 130 may be formed therethrough with a first fastening hole h1 allowing the first fastener 210 to pass therethrough and to be coupled thereto, and the first fastener 210 may be coupled to the second motor 110, the seventh board 120, and the sixth board 130 by screw fastening.

The second fastener 220 sequentially passes through the first motor 190, the first board 180, and the second board 170 to achieve coupling therebetween.

Here, each of the first motor 190, the first board 180, and the second board 170 may be formed therethrough with a second fastening hole h2 allowing the second fastener 220 to pass therethrough and to be coupled thereto, and the second fastener 210 may be coupled to the first motor 190, the first board 180, and the second board 170 by screw fastening.

The third fastener 230 simultaneously passes through the first to seventh boards 180 to 120 to achieve coupling therebetween.

Here, each of the first to seventh boards 180 to 120 may be formed therethrough with a third fastening hole h3 allowing the third fastener 220 to simultaneously pass therethrough and to be coupled thereto, and the third fastener 210 may be coupled to the first to seventh boards 180 to 120 by screw fastening.

Use of the separate first to third fasteners 210 to 230 allows stepwise and more robust coupling between the first motor 190, the first to seventh boards 180 to 120, and the second motor 110.

As described above, the assembly-type axial drive module according to the present invention is made up of multiple component blocks, that is, the first motor 190, the first to seventh boards 180 to 120, and the second motor 110, and thus is easy to assemble while being easy to disassemble, thereby having improved portability.

Next, a 3D printer using an assembly-type axial drive module according to the present invention will be described with reference to FIG. 1 to FIG. 6.

Figure 5:
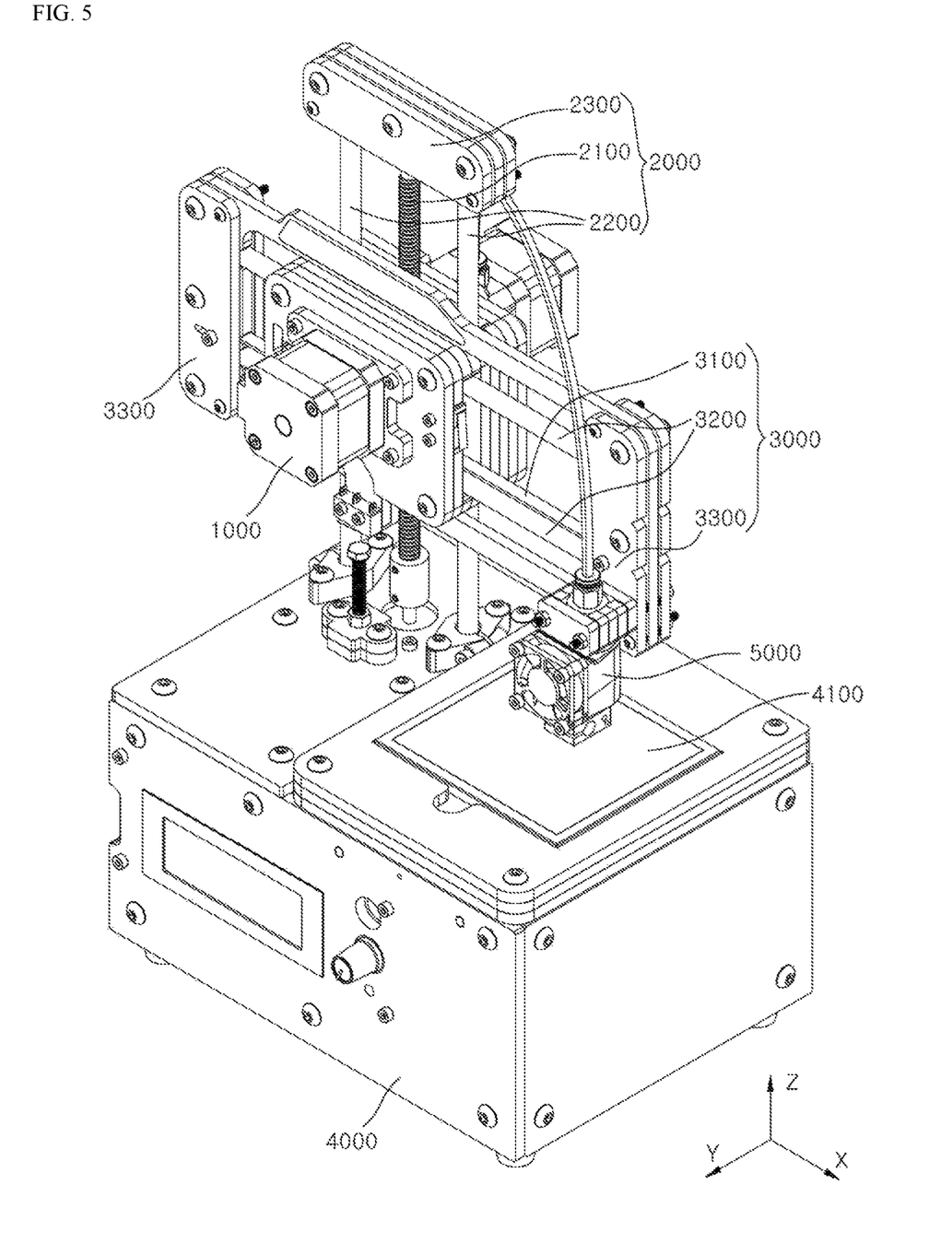
FIG. 5 is an overall perspective view of a 3D printer using the assembly-type axial drive module according to the present invention.

A 3D printer using an assembly-type axial drive module according to the present invention uses the assembly-type axial drive module 1000 set forth above, and includes a stacking unit 4000, a Z-axis movement unit 2000, an X-axis movement unit 3000, and an nozzle unit 5000.

An upper surface of the stacking unit 4000 is connected at one side thereof to the Z-axis movement unit 2000, and is formed at the other side thereof with a stacking stage 4100. In addition, the stacking unit 4000 is provided therein with a Z-axis motor (not shown) transmitting power to the Z-axis movement unit 2000.

The Z-axis movement unit 2000 is connected to the one side of the upper surface of the stacking unit 4000 to move the assembly-type axial drive module 1000 in the Z-axis direction, and the X-axis movement unit 3000 is moved in the X-axis direction by the assembly-type axial drive module 1000. The Z-axis movement unit 2000 and the X-axis movement unit 3000 will be described in detail further below.

The nozzle unit 5000 is coupled to the Z-axis movement unit 3000 to spray the filaments moved by the second motor 110 onto the stacking stage 4100, and the stacking stage 4100 is provided on a lower surface thereof with a Y-axis movement unit (not shown) moving the stacking stage 4100 in the Y-axis direction.

Figure 6:
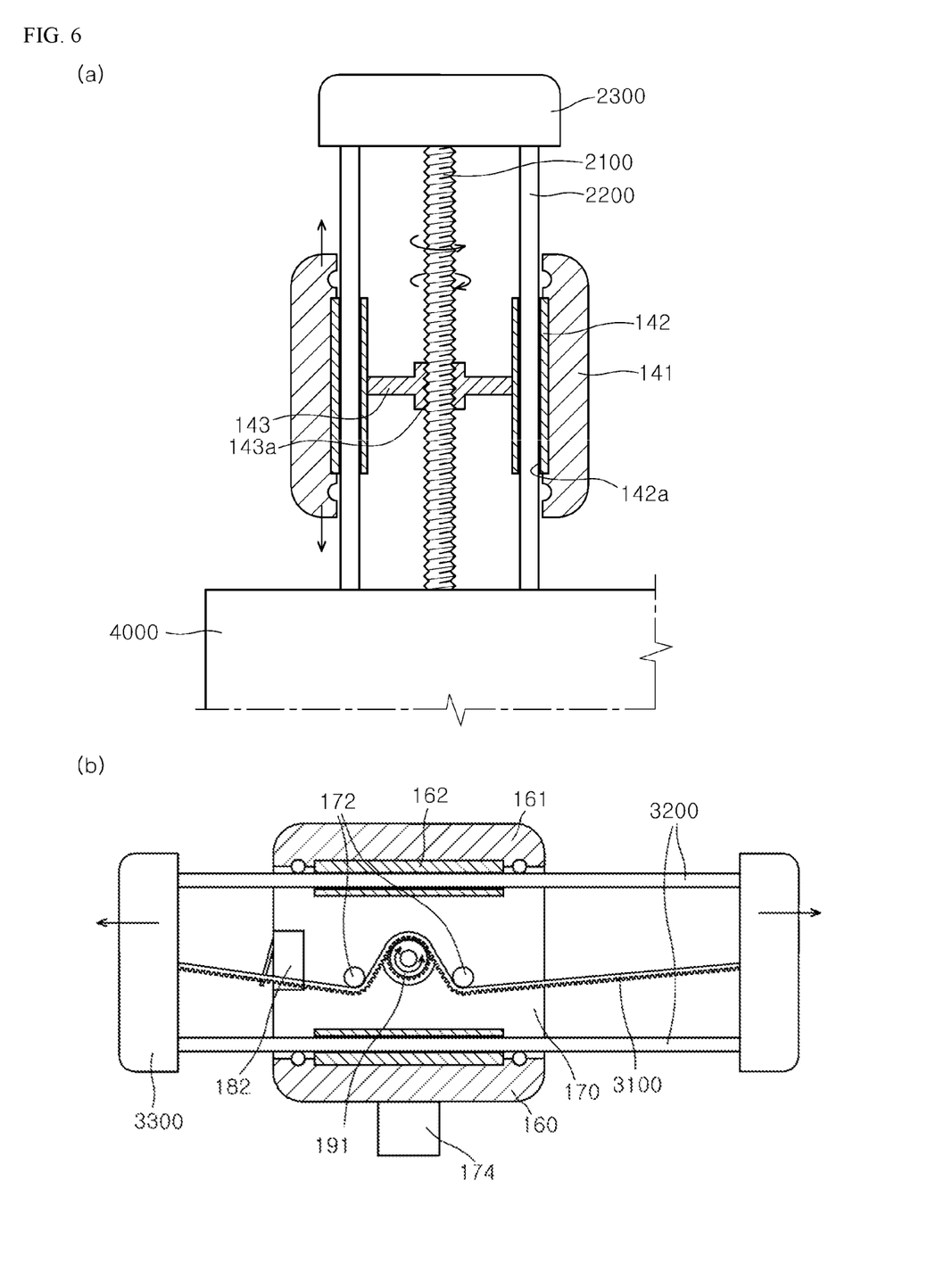
FIG. 6 is a view illustrating movement of a nozzle unit along the x- and y-axes by the assembly-type axial drive module in the 3D printer using the assembly-type axial drive module according to the present invention.

Now, the Z-axis movement unit 2000 and the X-axis movement unit 3000 will be described in detail with reference to FIG. 5 and FIG. 6.

The Z-axis movement unit 2000 includes a Z-axis movement shaft 2100, Z-axis movement guide shafts 2200, and a Z-axis stopper 2300.

The Z-axis movement shaft 2100 is inserted into the connection panel hole 143a of the block connection panel 143, and has a second thread formed on an outer surface thereof to be engaged with the first thread.

The Z-axis movement shaft 2100 is rotated clockwise or counterclockwise depending on the driving direction of the Z-axis motor such that the fifth board 140 connected to the Z-axis movement shaft 2100 is moved up or down to allow the assembly-type axial drive module 1000 to be moved up or down, and an X-axis movement shaft connected to the assembly-type axial drive module 1000 is moved up or down, whereby the nozzle unit 5000 coupled to the X-axis movement shaft is moved up or down.

The Z-axis movement guide shafts 2200 are inserted into the second block holes 142a of the second movement guide blocks 142, respectively, to guide a movement direction of the fifth board 140. That is, the Z-axis movement guide shafts 2200 guide the movement of the fifth board 140 such that the fifth board 140 can only be moved in the Z-axis direction without being rotated about the Z-axis when moved up or down depending on a rotational direction of the Z-axis movement guide shafts 2200.

The Z-axis stopper 2300 is coupled to an end of the Z-axis movement shaft 2100 and an end of each of the Z-axis movement guide shafts 2200 to prevent the assembly-type axial drive module 1000 from leaving the Z-axis movement shaft 2100 and the Z-axis movement guide shafts 2200.

The X-axis movement unit 3000 includes a timing belt 3100, X-axis movement guide shafts 3200, and X-axis stoppers 3300.

The timing belt 3100 is disposed across a space between the first movement guide blocks 162 facing each other, and is formed with teeth to be engaged with the gear 191, wherein a surface of the timing belt with the teeth formed thereon is disposed to be engaged with the gear 191 and the other surface of the timing belt is disposed to be engaged with the belt tension maintaining portion 172.

Accordingly, the timing belt 3100 is moved right or left in a longitudinal direction of the X-axis movement unit 3000 depending on the rotational direction of the gear 191, whereby the nozzle unit coupled to the X-axis movement shaft 5000 can be moved right or left.

The X-axis movement guide shafts 3200 are inserted into the first block holes 162a of the first movement guide blocks 162, respectively, to guide the movement direction of the third board 160, and X-axis stoppers 3300 are coupled to opposite ends of each of the X-axis movement guide shafts 3200 and opposite ends of the timing belt 3100, respectively, to prevent the third board 160 from leaving the X-axis movement guide shafts 3200 and the timing belt 3100.

That is, a 3D stack can be formed on the stacking stage through Z- and X-axes movement of the nozzle unit 5000 by the assembly-type axial drive module 1000 and Y-axis movement of the stacking stage.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

| <List of Reference numerals> | |
|---|---|
| 100: Drive body | 110: Second motor |
| 120: Seventh board | 130: Sixth board |
| 131, 151: Second block insertion portion | |
| 132, 152: Panel insertion hole | |
| 140: Fifth board | 141: Fifth board body |
| 142: Second movement guide block | 142a: Second block hole |
| 143: Block connection panel | 143a: Connection panel hole |
| 150: Fourth board | 153, 173: First block insertion portion |
| 160: Third board | 161: Third board body |
| 162: First movement guide block | 162a: First block hole |
| 170: Second board | 171: Second gear passing-through portion |
| 172: Belt tension maintaining portion | 174: Z-axis zero adjustment unit |
| 180: First board | 181: First gear passing-through portion |
| 182: X-axis zero adjustment unit | 190: First motor |
| 191: Gear | 200: Body fastener |
| 210: First fastener | 220: Second fastener |
| 230: Third fastener | |

| <List of Reference numerals> | |
|---|---|
| 1000: Assembly-type axial drive module | 2000: Z-axis movement unit |
| 2100: Z-axis movement shaft | 2200: Z-axis movement guide shaft |
| 2300: Z-axis stopper | 3000: X-axis movement unit |
| 3100: Timing belt | 3200: X-axis movement guide shaft |
| 3300: X-axis stopper | 4000: Stacking unit |
| 4100: Stacking stage | 5000: Nozzle unit |

What is claimed is:

1. An assembly-type axial drive module comprising:
a first motor having a rear side and a gear, wherein the gear protrudes from the rear side of the first motor;
a first board coupled to the rear side of the first motor, wherein the gear of the first motor passes through a portion of the first board;
a second board coupled to a rear side of the first board, wherein the gear of the first motor passes through a portion of the second board;
a third board coupled to a rear side of the second board, wherein the third board comprises at least one first movement guide block, wherein the at least one movement guide block is capable of receiving a horizontal shaft;
a fourth board coupled to a rear side of the third board, wherein the fourth board comprises at least one first block insertion portion capable of partially receiving the at least one first movement guide block of the third board;
a fifth board coupled to a rear side of the fourth board, wherein the fifth board comprises at least one second movement guide block, wherein the at least one second movement guide block is capable of receiving a vertical shaft;
a sixth board coupled to a rear side of the fifth board, wherein the sixth board comprises at least one second block insertion portion capable of partially receiving the at least one second movement guide block;
a seventh board coupled to a rear side of the sixth board; and
a second motor coupled to a rear side of the seventh board, wherein the second motor is connected to a filament storage unit storing filaments, wherein the second motor is configured to move the filaments.

2. The assembly-type axial drive module according to claim 1,
wherein the third board further comprises two third board bodies each having surfaces, wherein the two third board bodies are horizontally arranged to face each other and spaced apart from each other;
wherein the at least one first movement guide block comprises two first movement guide blocks, wherein the two first movement guide blocks are respectively coupled to the surfaces of the two third board bodies, and
wherein each of the two first movement guide blocks comprise a first block hole having an inner surface and a first bearing, wherein each first bearing is formed on the inner surface of the first block hole, respectively.

3. The assembly-type axial drive module according to claim 2,
wherein the surfaces of the two third board bodies face each other,
wherein the surfaces of the two third board bodies respectively comprise a width,
wherein the two first movement guide blocks respectively comprise a diameter, and
wherein the diameter of each first movement guide block is larger than the width of the surface of the third board body where the respective first movement guide block is coupled.

4. The assembly-type axial drive module according to claim 2,
wherein the fifth board comprises two fifth board bodies each having surfaces, wherein the two fifth board bodies are vertically arranged to face each other and spaced apart from each other;
wherein the at least one second movement guide block comprises two second movement guide blocks, wherein the two second movement guide blocks are respectively coupled to one of the surfaces the two fifth board bodies;
wherein the fifth board further comprises a block connection panel, wherein the block connection panel is coupled to both of the second movement guide blocks such that the two second movement guide blocks are connected to each other;
wherein each of the two second movement guide blocks comprise a second block hole having an inner surface and a second bearing, wherein each second bearing is formed on the inner surface of the second movement guide block, respectively; and
the block connection panel has a connection panel hole formed at a center, the connection panel hole comprises an inner surface and a first thread, wherein the first thread is formed on the inner surface of the connection panel hole.

5. The assembly-type axial drive module according to claim 4, wherein each surface of the two fifth board bodies comprises a width,
wherein each of the second movement guide blocks comprises a diameter, wherein each diameter of the second movement guide block is larger than the width of the surface where the respective second movement guide block is coupled.

6. The assembly-type axial drive module according to claim 4, wherein:
wherein the gear of the first motor passing through the portion of the second board protrudes towards the fifth board; and
wherein the second board comprises a belt tension maintaining portion, wherein the belt tension maintaining portion protrudes towards the fifth board.

7. A 3D printer comprising the assembly-type axial drive module according to claim 6, the 3D printer further comprising:
a stacking unit comprising an upper surface and a stacking stage;
a Z-axis movement unit connected to the upper surface of the stacking unit, wherein the Z-axis movement unit is capable of moving the assembly-type axial drive module in a Z-axis direction;

an X-axis movement unit, wherein the assembly-type axial drive module moves the X-axis unit in an X-axis direction; and a nozzle unit coupled to the X-axis movement unit, wherein the nozzle unit is adapted to spray the filaments moved by the second motor, wherein the stacking stage is adapted to receive the filaments thereon, and a Y-axis movement unit configured to move the stacking stage in a Y-axis direction.

8. The 3D printer according to claim 7, wherein the Z-axis movement unit comprises:

Z-axis movement guide shafts inserted into the second block holes of the second movement guide blocks, respectively, to guide a movement direction of the fifth board;

a Z-axis movement shaft having a second thread formed on an outer surface, wherein the Z-axis movement shaft having the second thread is inserted into the connection panel hole of the block connection panel, wherein a second thread is capable of engaging with the first thread of the connection panel hole; and a plurality of Z-axis stoppers respectively coupled to an end of each of the Z-axis movement guide shafts and respectively coupled to an end of the Z-axis movement shaft, wherein the nozzle unit is moved up or down depending on a rotational direction of the Z-axis movement shaft.

9. The 3D printer according to claim 7, wherein the X-axis movement unit comprises:

X-axis movement guide shafts inserted into the first block holes of the first movement guide blocks, respectively, to guide a movement direction of the third board;

a timing belt comprising teeth capable of engaging with the gear, wherein the timing belt is disposed across a space between the two first movement guide blocks, wherein the timing belt is capable of being tensioned by the belt tension maintaining portion; and a plurality of X-axis stoppers respectively coupled to opposite ends of the timing belt and respectively coupled to opposite ends of each of the X-axis movement guide shafts, and wherein the nozzle unit is moved right or left depending on a rotational direction of the gear of the first motor.

\* \* \* \* \*